United States Patent [19]
Feuerstraeter et al.

[11] Patent Number: 6,154,464
[45] Date of Patent: *Nov. 28, 2000

[54] PHYSICAL LAYER DEVICE HAVING A MEDIA INDEPENDENT INTERFACE FOR CONNECTING TO EITHER MEDIA ACCESS CONTROL ENTITICES OR OTHER PHYSICAL LAYER DEVICES

[75] Inventors: Mark T. Feuerstraeter; Michael A. Sokol, both of Rancho Cordova; David W. Vogel, El Dorado Hills, all of Calif.

[73] Assignee: Level One Communications, Inc., Sacramento, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/854,109

[22] Filed: May 9, 1997

[51] Int. Cl.$^7$ .......................................... A04J 3/16

[52] U.S. Cl. ............................................ 370/463; 370/469

[58] Field of Search ..................................... 370/445, 446, 370/465, 469, 296, 463, 351, 315; 375/258

[56] References Cited

U.S. PATENT DOCUMENTS

| | | | |
|---|---|---|---|
| 5,414,708 | 5/1995 | Webber et al. | 370/445 |
| 5,541,957 | 7/1996 | Lau | 375/258 |
| 5,754,540 | 5/1998 | Liu et al. | 370/315 |
| 5,754,552 | 5/1998 | Allmond et al. | 370/465 |
| 5,802,054 | 9/1998 | Bellenger | 370/401 |
| 5,995,514 | 11/1999 | Lo | 370/463 |

FOREIGN PATENT DOCUMENTS

| | | | |
|---|---|---|---|
| WO83/00238 | 1/1983 | WIPO | G06F 3/04 |
| WO96/29801 | 9/1996 | WIPO | H04L 12/44 |

OTHER PUBLICATIONS

Johnson, H.W., "Fast Ethernet, Dawn of a New Network"; USA XP002073888; 1996; Prentice Hall Ptr..; pp. 57–61 and 106–114.

International Search Report from corresponding PCT application Serial No.: PCT/US98/09436.

*Primary Examiner*—Hassan Kizou
*Assistant Examiner*—John Pezzlo
*Attorney, Agent, or Firm*—Merchant & Gould P.C.

[57] ABSTRACT

A PHY having a media independent interface (MII) providing connections to a MAC or to another PHY is disclosed. The invention provides a mechanism for connecting a first PHY with a second PHY, wherein the PHY may act as the media access control side of the MII. The system includes a selection means for selecting the mode of operation for the PHY, a MII for providing a synchronous digital interface carrying un-encoded data over separate transmit and receive paths and a translation entity for generating output enables for controlling the flow of the data, wherein the translation entity establishes in response to mode being selected a first flow of data for connecting the PHY to a Media Access Control entity or a second flow of data for connecting the PHY to a second PHY. The translation entity muxes data and control signals based upon the mode selection. A translation synchronization entity is provided. The synchronization entity may includes a 10 Mbps synchronization entity and/or a 100 Mbps synchronization entity. The MII receives a transmit and receive clock from a second PHY when the PHY is connected to a second PHY, and the translation synchronization entity synchronizes the internal clocks and the MII transmit and receive clocks. An interface to a 10 or 100 Mbps repeater entity is provided wherein the interface maps a transmit data path from the translation entity to the repeater entity and receive data paths from the repeater entity to the translation entity.

23 Claims, 9 Drawing Sheets

FIG. 9

| MIF_ENT OUTPUT NAME | OUTPUT ENABLE STATE CONNECTED DEVICE = MAC | OUTPUT ENABLE STATE CONNECTED DEVICE = PHY |
|---|---|---|
| CLK_OUT | ACTIVE | INACTIVE |
| TXD_OUT | INACTIVE | ACTIVE |
| TXEN_OUT | INACTIVE | ACTIVE |
| TXER_OUT | INACTIVE | ACTIVE |
| RXD_OUT | ACTIVE | INACTIVE |
| RXDV_OUT | ACTIVE | INACTIVE |
| RXER_OUT | ACTIVE | INACTIVE |
| COL_OUT | ACTIVE | INACTIVE |
| CRS_OUT | ACTIVE | INACTIVE |

PHYSICAL LAYER DEVICE HAVING A MEDIA INDEPENDENT INTERFACE FOR CONNECTING TO EITHER MEDIA ACCESS CONTROL ENTITICES OR OTHER PHYSICAL LAYER DEVICES

BACKGROUND OF THE INVENTION

1. Field of the Invention

This invention relates in general to Physical Layer device, and more particularly to a Physical Layer device having a media independent interface providing connections to either another Physical Layer device or a Media Access Control device.

2. Description of Related Art

Recent advancements in the art of data communications have provided great strides in resource sharing amongst computer systems through the use of networks which offer reliable high-speed data channels. Networks allow versatility by defining a common standard for communication so that information according to a standard protocol may be exchanged across user applications. As the popularity of networks increase so does the demand for performance. More sophisticated protocols are being established to meet this demand and are utilizing existing twisted pair wires, as well as more advanced transmission media, in office buildings so that many users have access to shared resources at minimal expense.

As will be appreciated by those skilled in the art, communication networks and their operations can be described according to the Open Systems Interconnection (OSI) model which includes seven layers including an application, presentation, session, transport, network, link, and physical layer. The OSI model was developed by the International Organization for Standardization (ISO) and is described in "The Basics Book of OSI and Network Management" by Motorola Codex from Addison-Wesley Publishing Company, Inc., 1993 (First Printing September 1992), and which is incorporated by reference herein.

Each layer of the OSI model performs a specific data communications task, a service to and for the layer that precedes it (e.g., the network layer provides a service for the transport layer). The process can be likened to placing a letter in a series of envelopes before it is sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written. In a data communication transaction, however, each end user is unaware of the envelopes, which perform their functions transparently. For example, an automatic bank teller transaction can be tracked through the multi-layer OSI system. One multiple layer system (Open System A) provides an application layer that is an interface to a person attempting a transaction, while the other multiple layer system (Open System B) provides an application layer that interfaces with applications software in a bank's host computer. The corresponding layers in Open Systems A and B are called peer layers and communicate through peer protocols. These peer protocols provide communication support for a user's application, performing transaction related tasks such as debiting an account, dispensing currency, or crediting an account.

Actual data flow between the two open systems (Open System A and Open System B), however, is from top to bottom in one open system (Open System A, the source), across the communications line, and then from bottom to top in the other open system (Open System B, the destination). Each time that user application data passes downward from one layer to the next layer in the same system more processing information is added. When that information is removed and processed by the peer layer in the other system, it causes various tasks (error correction, flow control, etc.) to be performed.

The ISO has specifically defined all seven layers, which are summarized below in the order in which the data actually flows as they leave the source:

Layer 7, the application layer, provides for a user application (such as getting money from an automatic bank teller machine) to interface with the OSI application layer. That OSI application layer has a corresponding peer layer in the other open system, the bank's host computer.

Layer 6, the presentation layer, makes sure the user information (a request for $50 in cash to be debited from your checking account) is in a format (i.e., syntax or sequence of ones and zeros) the destination open system can understand.

Layer 5, the session layer, provides synchronization control of data between the open systems (i.e., makes sure the bit configurations that pass through layer 5 at the source are the same as those that pass through layer 5 at the destination).

Layer 4, the transport layer, ensures that an end-to-end connection has been established between the two open systems and is often reliable (i.e., layer 4 at the destination confirms the request for a connection, so to speak, that it has received from layer 4 at the source).

Layer 3, the network layer, provides routing and relaying of data through the network (among other things, at layer 3 on the outbound side an address gets placed on the envelope which is then read by layer 3 at the destination).

Layer 2, the data link layer, includes flow control of data as messages pass down through this layer in one open system and up through the peer layer in the other open system.

Layer 1, the physical interface layer, includes the ways in which data communications equipment is connected mechanically and electrically, and the means by which the data moves across those physical connections from layer 1 at the source to layer 1 at the destination.

The primary standard for Local and Metropolitan Area Network technologies is governed by IEEE Std. 802, which is incorporated by reference herein. IEEE Std. 802 describes the relationship among the family of 802 standards and their relationship to the ISO OSI Basic Reference Model. Generally, IEEE Std. 802 prescribes the functional, electrical and mechanical protocols, and the physical and data link layers for Local and Metropolitan Area Networks (LAN/MAN). The specification augments network principles, conforming to the ISO seven-layer model for OSI, commonly referred to as "Ethernet". In the hierarchy of the seven-layer model, the lowest layers, the so-called physical and data link layers, comprise functional modules that specify the physical transmission media and the way network nodes interface to it, the mechanics of transmitting information over the media in an error-free manner, and the format the information must take in order to be transmitted.

While there are several LAN technologies in use today, Ethernet is by far the most popular. The Ethernet standards include protocols for a 10 Mbps baseband transmissions typically referred to as 10Base-X. Computers equipped with a 10Base-X Ethernet interface attachments may link to other computers over an Ethernet LAN. These Ethernet LAN's provide fast and reliable data transmission networks. Nevertheless, the need for faster data transmission has led to the development of faster standards. One such standard includes the Fast Ethernet standards typically referred to as 100Base-X. The 100Base-X standards generally follow the 10Base-X standards except that the baseband data transmission rate increases from 10 Mbps to 100 Mbps. The 100Base-X standard, however, retains the original CSMA/CD medium access control mechanism.

The media independent interface (MII) is a set of electronics that provides a link to the Ethernet medium access control functions in the network device with the Physical Layer device (Physical Layer device) that sends signals onto the network medium. A media independent interface supports both 10 Mbps and 100 Mbps operations, allowing suitably equipped network devices to connect to 10Base-T and 100Base-T media segments.

The media independent interface is designed to make the signaling differences among the various media segments transparent to the Ethernet chips in the network device. The media independent interface converts the line signals received from the various media segments by the transceiver (Physical Layer device) into digital format signals that are then provided to the data link layer.

Nevertheless, there are network implementations where a Media Access Control entity is not present. For example, a Media Access Control entity is commonly absent in 10Base-T and 100Base-X repeaters. Still, using the media independent interface to connect to a Physical Layer device is desirable.

It can be seen then that there is a need for a mechanism for connecting a first Physical Layer device with a second Physical Layer device.

It can be seen that there is a need for a Physical Layer device to act as the media access control side of the media independent interface.

SUMMARY OF THE INVENTION

To overcome the limitations in the prior art described above, and to overcome other limitations that will become apparent upon reading and understanding the present specification, the present invention discloses a Physical Layer device having a media independent interface providing connections to another Physical Layer device.

The present invention solves the above-described problems by providing a mechanism for connecting a first Physical Layer device with a second Physical Layer device, wherein the Physical Layer device may act as the media access control side of the media independent interface.

A system in accordance with the principles of the present invention includes a selection means for selecting the mode of operation for the Physical Layer device, a selector for setting the speed of operation for the media independent interface, a media independent interface for providing a synchronous digital interface carrying un-encoded data over separate transmit and receive paths and a translation entity for generating output enables for controlling the flow of the data, wherein the translation entity establishes in response to mode being selected a first flow of data for connecting the Physical Layer device to a Media Access Control entity or a second flow of data for connecting the Physical Layer device to a second Physical Layer device.

Other embodiments of a system in accordance with the principles of the invention may include alternative or optional additional aspects. One such aspect of the present invention is that the translation entity muxes data and control signals based upon the mode and speed selection.

Another aspect of the present invention is that a translation synchronization entity is provided.

Another aspect of the present invention is that the synchronization entity comprises a 10 Mbps synchronization entity.

Another aspect of the present invention is that the is synchronization entity comprises a 100 Mbps synchronization entity.

Still another aspect of the present invention is that an internal clock is provided, and wherein the media independent interface receives a transmit and receive clock from a second Physical Layer device when the Physical Layer device is connected to a second Physical Layer device, the translation synchronization entity synchronizing the internal clocks and the media independent interface transmit and receive clocks.

Another aspect of the present invention is that an interface to a 10 Mbps repeater entity is provided wherein the 10 Mbps interface maps a transmit data path from the translation entity to the 10 Mbps repeater entity and receive data paths from the 10 Mbps repeater entity to the translation entity.

Another aspect of the present invention is that an interface to a 100 Mbps repeater entity is provided wherein the 100 Mbps interface maps a transmit data path from the translation entity to the 100 Mbps repeater entity and receive data paths from the 100 Mbps repeater entity to the translation entity.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 9 is a table illustrating the state of the output enables which depend on the type of device that the PHY/MII device is connected to on the Media Independent Interface.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a Physical Layer device having a media independent interface providing connections to either a Media Access Control entity (MAC) or another Physical Layer device (PHY).

Figure 1:
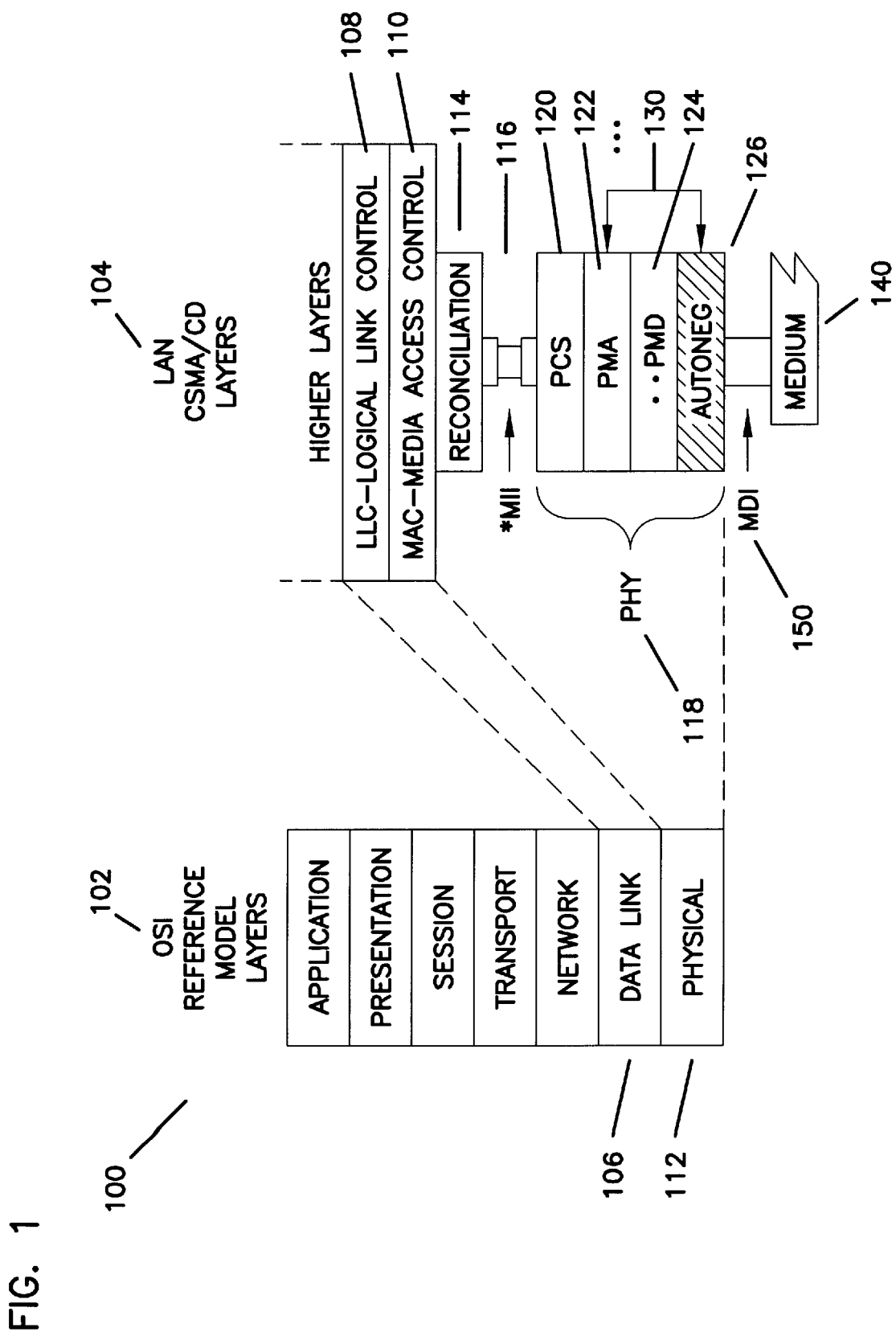
FIG. 1 illustrates a comparison of the OSI reference model to the LAN CSMA/CD layers.

FIG. 1 illustrates a comparison 100 of the OSI reference model 102 to the LAN CSMA/CD layers 104. The data link 106 in the OSI model corresponds to the logical link control (LLC) 108 and the media access control (MAC) 110 in the LAN CSMA/CD layers 104. The physical layer 112 in the OSI model 100 corresponds to the reconciliation layer 114, the medium independent interface 116, and the Physical Layer device 118.

The Physical Layer device 118 includes the physical coding 120, the physical medium attachment 122, the physical medium dependent 124, and the auto-negotiation sublayers 126. However, the physical medium dependent sublayer 124 is not specified for 100Base-FX.

The IEEE specification for the physical layer concerns issues such as the physical characteristics of the transmission medium (typically an electrical wire or cable, although fiber optics or wireless transmission is used in some implementations) and the mechanical connection from the station to the transmission medium. This specification addresses physical specifications, including plug dimensions, the number of pins in the plug, and the placement of the pins. Also addressed are electrical issues, such as the voltage levels of the signals that flow on the wire, and functional issues, such as the meaning of a particular voltage level on a given wire.

The physical coding sublayer (PCS) 120 provides services to the Media Access Control sublayer 110. The PCS sublayer 120 in a source station is responsible for encoding the data passed down from the Media Access Control sublayer 110 in a transmitting station. The data encoding function is responsible for translating the bits being transmitted into the proper electrical signals that are then broadcast over the transmission medium.

The PCS sublayer 120 in a destination station is responsible for decoding the signal it receives. The decoding function translates received signals into an appropriate bit stream and passes the resulting data up to the Media Access Control sublayer 110. The PCS sublayer 120 is also responsible for listening to the transmission medium, notifying the Media Access Control sublayer 110 whether the carrier is free or busy, and detecting collisions.

The physical medium attachment (PMA) sublayer 122 provides services to the PCS sublayer 120. It performs a translation function between the PCS sublayer 120 and the transmission medium 140 and defines the characteristics of a particular type of transmission medium 140. The interface between the Media Access Control sublayer 110 and the PCS sublayer 120 (the PCS-PMA interface) defines the services that a PMA sublayer entity 122 supplies to a PCS sublayer entity 120.

The PCS 120 and PMA 122 sublayers may be implemented in the same device or in separate devices. The interface to the transmission medium 140 (the PMA-Medium interface) is a concrete interface called the Medium Dependent Interface (MDI) 150. The MDI 150 for a particular form of transmission medium defines the characteristics of cable segments (sometimes called the trunk cable), connectors for joining cable segments and connecting cable segments to equipment, and terminators used at the ends of cable segments. Although the transmission medium ordinarily consists of a physical cable, such as coaxial cable, twisted-pair cable, or fiber-optics cable, it can also consist of a microwave link, or other wireless link, in some Ethernet implementations.

Auto-negotiation 126 communicates with the physical medium attachment sublayer 122 through the physical medium attachment service interface 130. Auto-negotiation's 126 flexibility and expandability is provided through the encoding of a 16 bit word. The 16 bit word is referred to as the Link Code Word (LCW).

The media independent interface 116 provides an interconnection between the Media Access Control sublayer and the Physical Layer entities (Physical Layer device). The Media independent interface supports both 10 Mbps and 100 Mbps data rates through four bit wide (nibble wide) transmit and receive paths. The Reconciliation sublayer 114 provides a mapping between the signal provided at the Media Independent Interface 116 and the Media Access Control 110/Physical layer 118 signaling service definition.

Figure 2:
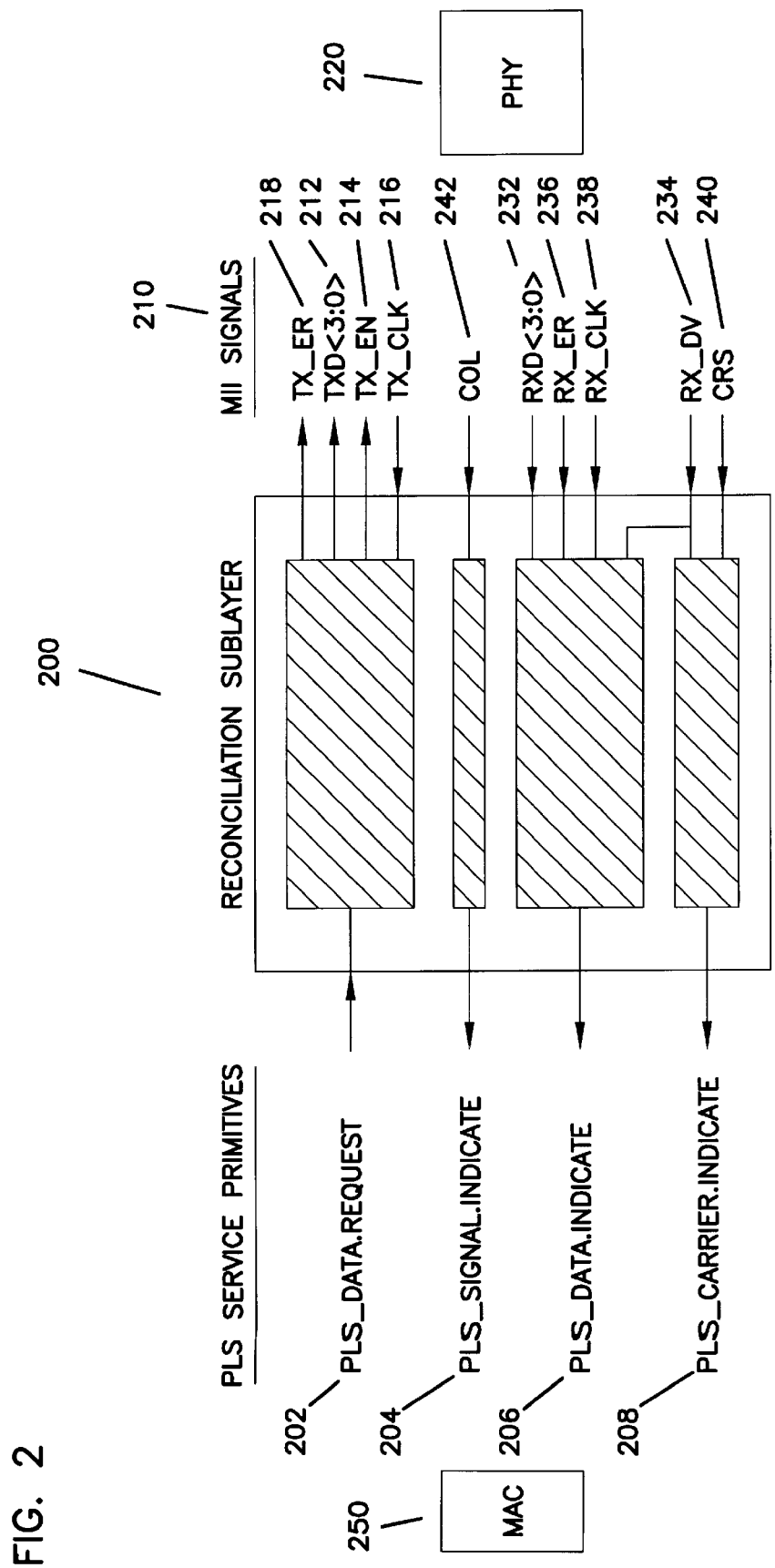
FIG. 2 illustrates the inputs and outputs between the Media Access Control/Physical layer signaling services for the Reconciliation layer.

FIG. 2 illustrates the inputs and outputs between the Media Access Control/Physical layer signaling services for the Reconciliation layer 200. The Reconciliation layer 200 maps the PLS_DATA.request 202 to the Media Independent Interface signals 210 including transmit data (TXD<3:0>) 212, transmit enable (TX_EN) 214 transmit error (TX_ER) 218, and transmit clock (TX_CLK) 216 sourced by the Physical Layer device 220. Synchronization between the Reconciliation sublayer 200 and the Physical Layer device 220 is achieved via the transmit clock 216. While the Physical Layer device 220 generates the transmit clock 216, the transmit data 212, transmit error 218, and transmit enable 214 signals are generated by the reconciliation sublayer 200.

PLS_DATA.indicate 206 is mapped to the receive data (RXD<3:0>) 232, received data valid (RX_DV) 234, receive data error (RX_ER) 236, and receive clock (RX_CLK) 238. The reliability of the data transferred to the Media Access Control sublayer 250 is shown by the RX_ER signal 236. Synchronization between the Physical Layer device 220 and the Reconciliation sublayer 200 is achieved using the receive clock signal 238.

The PLS_DATA.indicate primitive 206 is generated to all other Media Access Control 250 sublayer entities in the network after a PLS_DATA.request 202 is issued. Each nibble of data transferred on RXD<3:0> 232 results in the generation of four PLS_DATA.indicate transactions 206.

The PLS_CARRIER.indicate primitive 208 is mapped to Media Independent Interface signals CRS 240 and RX_DV 234. The PLS_CARRIER.indicate primitive 208 is used to indicate the carrier status parameter. The PLS_CARRIER.indicate service primitive 208 is generated by the reconciliation sublayer 200 whenever the status of the carrier parameter changes.

The PLS_SIGNAL.indicate primitive 204 is mapped to the Media Independent Interface collision signal (COL) 242. The PLS_SIGNAL.indicate service primitive 204 is generated whenever the signal status makes a transition from an error condition to no error condition or vice versa. If, during frame reception, both RX_DV 234 and RX_ER 236 are asserted, the Reconciliation sublayer 200 ensures that the Media Access Control 250 will detect a FRAME CHECK ERROR in that frame.

If, during the process of transmitting a frame, it is necessary to request that the Physical Layer device 220 deliberately corrupt the contents of the frame in such a manner that a receiver will detect the corruption with the highest degree of probability, then the signal TX_ER 218 may be generated. For example, a repeater that detects an RX_ER 236 during frame reception on an input port may propagate that error indication to its output ports by asserting TX_ER 218 during the process of transmitting that frame. Since there is no mechanism in the definition of the Media Access Control sublayer 250 by which the transmit data stream can be deliberately corrupted, the Reconciliation sublayer 200 is not required to generate TX_ER 218.

TX_CLK (Transmit Clock) 216 is a continuous clock that provides the timing reference for the transfer of the TX_EN 214, TXD 212, and TX_ER 218 signals from the Reconciliation sublayer 200 to the Physical Layer device 220. TX_CLK 216 is sourced by the Physical Layer device 220. The TX_CLK 216 frequency must be 25% of the nominal transmit date rate ±100 ppm. For example, a Physical Layer device 220 operating at 100 Mb/s must provide a TX_CLK 216 having a frequency of 25 MHz, and a Physical Layer device 220 operating at 10 Mb/s must provide a TX_CLK 216 having frequency of 2.5 MHz. The duty cycle of the TX_CLK signal 216 is between 35% and 65% inclusive.

RX_CLK 238 is a continuous clock that provides the timing reference for the transfer of the RX_DV 234, RXD 232, and RX_ER 236 signals from Physical Layer device 220 to the Reconciliation sublayer 200. RX_CLK 238 is also sourced by the Physical Layer device 220. The Physical Layer device 220 may recover the RX_CLK 238 reference from the received data or it may derive the RX_CLK 238 from a nominal clock (e.g., the TX_CLK 216 reference). The minimum high and low times of RX_CLK 238 is 35% of the nominal period under all conditions. While RX_DV 234 is asserted, RX_CLK 238 must be synchronous with the recovered data, have a frequency equal to 25% of the data rate of the received signal, and have a duty cycle of between 35% and 65% inclusive. When the signal received from the medium is continuous and the Physical Layer device 220 can recover the RX_CLK 238 reference and supply the RX_OLK 238 on a continuous basis, there is no need to transition between the recovered clock reference and a nominal clock reference on a frame-by-frame basis. If loss of received signal from the medium cause s a Physical Layer device 220 to lose the recovered RX_CLK 238 reference, the Physical Layer device 220 sources the RX_CLK 238 from a nominal clock reference.

Transitions from nominal clock to recovered clock or from recovered clock to nominal clock is made only while RX_DV 234 is de-asserted. During the interval between the assertion of CRS 240 and the assertion of RX_DV 234 at the beginning of a frame, the Physical Layer device 220 may extend a cycle of RX_CLK 238 by holding it in either the high or low condition until the Physical Layer device 220 has successfully locked onto the recovered clock. Following the de-assertion of RX_DV 234 at the end of a frame, the Physical Layer device 220 may extend a cycle of RX_CLK 238 by holding it in either the high or low condition for an interval not exceeding twice the nominal clock period.

TX_EN 214 indicates that the Reconciliation sublayer 200 is presenting nibbles on the Media Independent Interface 210 for transmission. It shall be asserted by the Reconciliation sublayer 200 synchronously with the first nibble of the preamble and shall remain asserted while all nibbles to be transmitted are presented to the Media Independent Interface. TX_EN 214 is negated prior to the first TX_CLK 216 following the final nibble of a frame. TX_EN 214 is driven by the Reconciliation sublayer 200 and transitions synchronously with respect to the TX_CLK 216.

TXD 212 is a bundle of 4 data signals (TXD<3:0>) that are driven by the Reconciliation sublayer 200. TXD<3:0> 212 transitions synchronously with respect to the TX_CLK 216. For each TX_CLK 216 period in which TX_EN 214 is asserted, TXD<3:0> 212 are accepted for transmission by the Physical Layer device 220. TXD<0> is the least significant bit of TXD 212. While TX_EN 214 is de-asserted, TXD<3:0> 212 has no effect upon the Physical Layer device 220.

TX_ER 218 transitions synchronously with respect to the TX_CLK 216. When TX_ER 218 is asserted for one or more TX_CLK 216 periods while TX_EN 214 is also asserted, the Physical Layer device 220 emits one or more symbols that are not part of the valid data or delimiter set somewhere in the frame being transmitted. The relative position of the error within the frame is not necessarily preserved. Assertion of the TX_ER 218 signal does not effect the transmission of data when a Physical Layer device 220 is operating at 10 Mb/s, or when TX_EN 214 is de-asserted. The TX_ER 218 is implemented at the Media Independent Interface of a Physical Layer device, at the Media Independent Interface of a repeater that provides an Media Independent Interface port, and in Media Access Control sublayer devices. If a Reconciliation sublayer 200 or a repeater with an Media Independent Interface port does not actively drive the TX_ER signal 218, the Reconciliation sublayer 200 ensures that the TX_ER signal 218 is pulled down to an inactive state at all times.

RX_DV (Receive Data Valid) 234 is driven by the Physical Layer device 220 to indicate that the Physical Layer device 220 is presenting recovered and decoded nibbles on the RXD<3:0> 232 bundle and that the data on RXD<3:0> 232 is synchronous to RX_CLK 238. RX_DV 234 transitions synchronously with respect to the RX_CLK 238. RX_DV 234 remains asserted continuously from the first recovered nibble of the frame through the final recovered nibble and is negated prior to the first RX_CLK 238 that follows the final nibble. In order for a received frame to be correctly interpreted by the Reconciliation sublayer 200 and the Media Access Control sublayer 250, RX_DV 234 must encompass the frame, starting no later than the Start Frame Delimiter (SFD) and excluding any End-of Frame delimiter.

RXD 232 is a bundle of four data signals (RXD<3:0>) that transition synchronously with respect to the RX_CLK 238. RXD<3:0> 232 are driven by the Physical Layer device 220. For each RX_CLK 238 period in which RX_DV 234 is asserted, RXD<3:0> 232 transfer four bits of recovered data from the Physical Layer device 220 to the Reconciliation sublayer 200. RXD <0> is the least significant bit. While RX_DV 234 is de-asserted, RXD<3:0> 232 has no effect on the Reconciliation sublayer 200.

While RX_DV 234 is de-asserted, the Physical Layer device 220 provides a False Carrier indication by asserting the RX_ER 236 signal while driving the value <1110> onto RXD<3:0> 232. In order for a frame to be correctly interpreted by the Media Access Control sublayer 250, a completely formed SFD must be passed across the Media Independent Interface. A Physical Layer device 220 is not required to loop data transmitted on TXD<3:0> 212 back RXD<3:0> 232 unless the loopback mode of operation is selected.

RX_ER (Receive Error) 236 is driven by the Physical Layer device 220. RX_ER 236 is asserted for one or more RX_CLK 238 periods to indicate to the Reconciliation sublayer 200 that an error (e.g., a coding error, or any error that the Physical Layer device 220 is capable of detecting, and that may otherwise be undetectable at the Media Access Control sublayer 250) was detected somewhere in the frame presently being transferred from the Physical Layer device 220 to the Reconciliation sublayer 200. RX_ER 236 transitions synchronously with respect to RX_CLK 238. While RX_DV 234 is de-asserted, RX_ER 236 has no effect on the Reconciliation sublayer 200.

CRS 240 is asserted by the Physical Layer device 220 when either the transmit or receive medium is not idle. CRS 240 is de-asserted by the Physical Layer device 220 when both the transmit and receive media are idle. The Physical Layer device 220 ensures that CRS 240 remains asserted throughout the duration of a collision condition. CRS 240 is not required to transition synchronously with respect to either the TX_CLK 216 or the RX_CLK 238. The behavior of the CRS signal 240 is unspecified when the full duplex mode is selected, or when the Auto-Negotiation process selects full duplex mode of operation.

COL 242 is asserted by the Physical Layer device 220 upon detection of a collision on the medium, and remains asserted while the collision condition persists. COL 242 is not required to transition synchronously with respect to either the TX_CLK 216 or the RX_CLK 238. The behavior of the COL signal 242 is unspecified when the full duplex mode is selected, or when the Auto-Negotiation process selects a full-duplex mode of operation.

Figure 3:
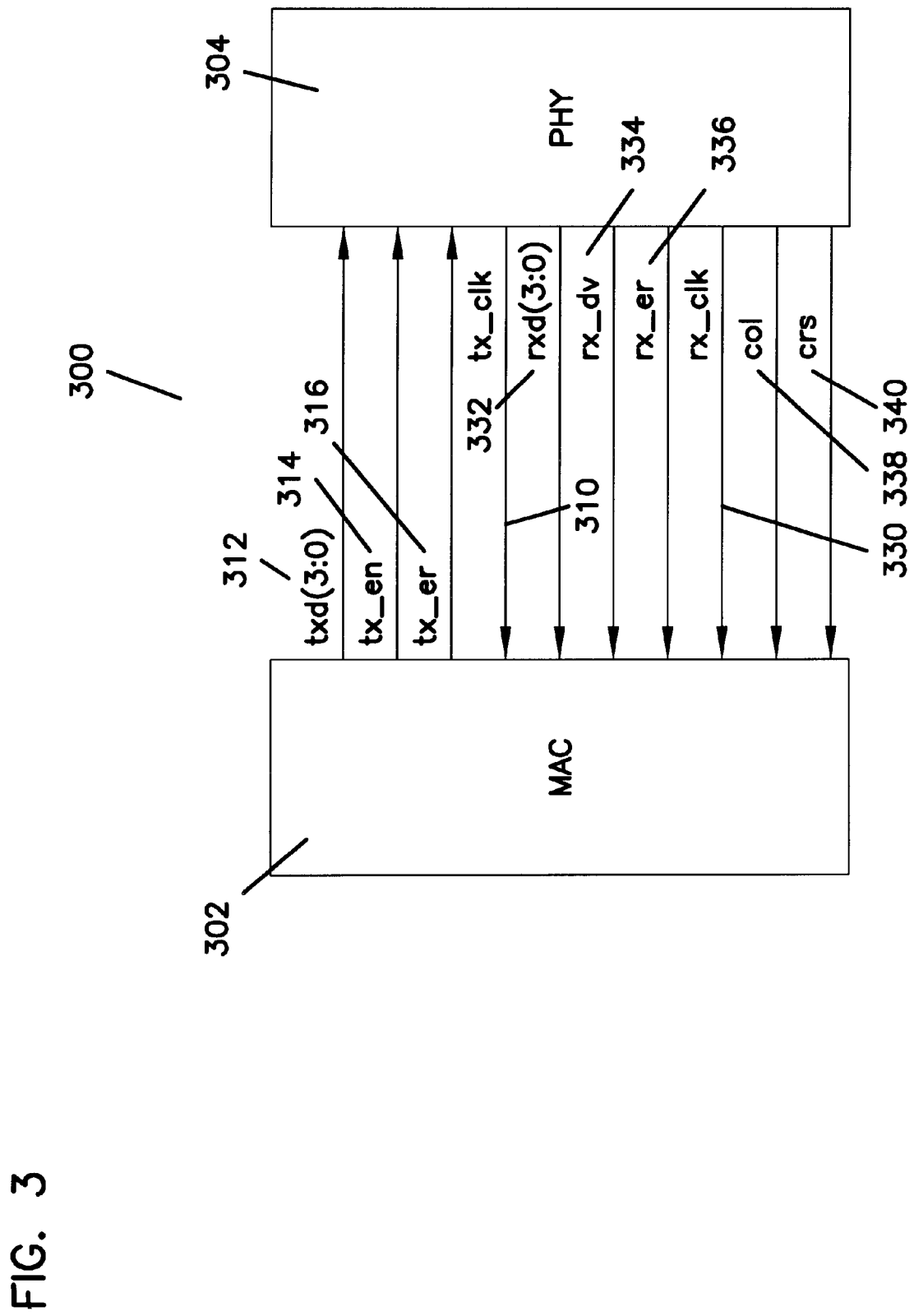
FIG. 3 illustrates a MAC/PHY connection wherein a Media Access Control entity is connected to a Physical Layer device.

FIG. 3 illustrates a MAC/PHY connection 300 wherein a Media Access Control entity 302 is connected to a Physical Layer device 304. The Physical Layer device can be a PHY/MII device according to the present invention. In this case, the PHY/MII device would emulate a Physical Layer device. Accordingly, FIG. 3 illustrates the Media Independent Interface (MII) providing a standard way of connecting Media Access Control entities and Physical Layer devices 304.

The Media Independent Interface is capable of supporting both 10 MHz and 100 MHz data rates, is synchronous to the transmit 310 or receive 330 clock, and provides independent transmit and receive paths. The Physical Layer devices 304 normally are connected to a Media Access Control 302 which would provide the interface to upper layers of communication protocol. The transmit and receive data paths are both composed of 7 signals: 4 bits of data 312, 332, a data qualifier indicating when data is valid 314, 334, an error signal 316, 336, and a clock 310, 330. There are also two control signals which convey information regarding collisions 338 and activity on the network (carrier sense) 340.

Figure 4:
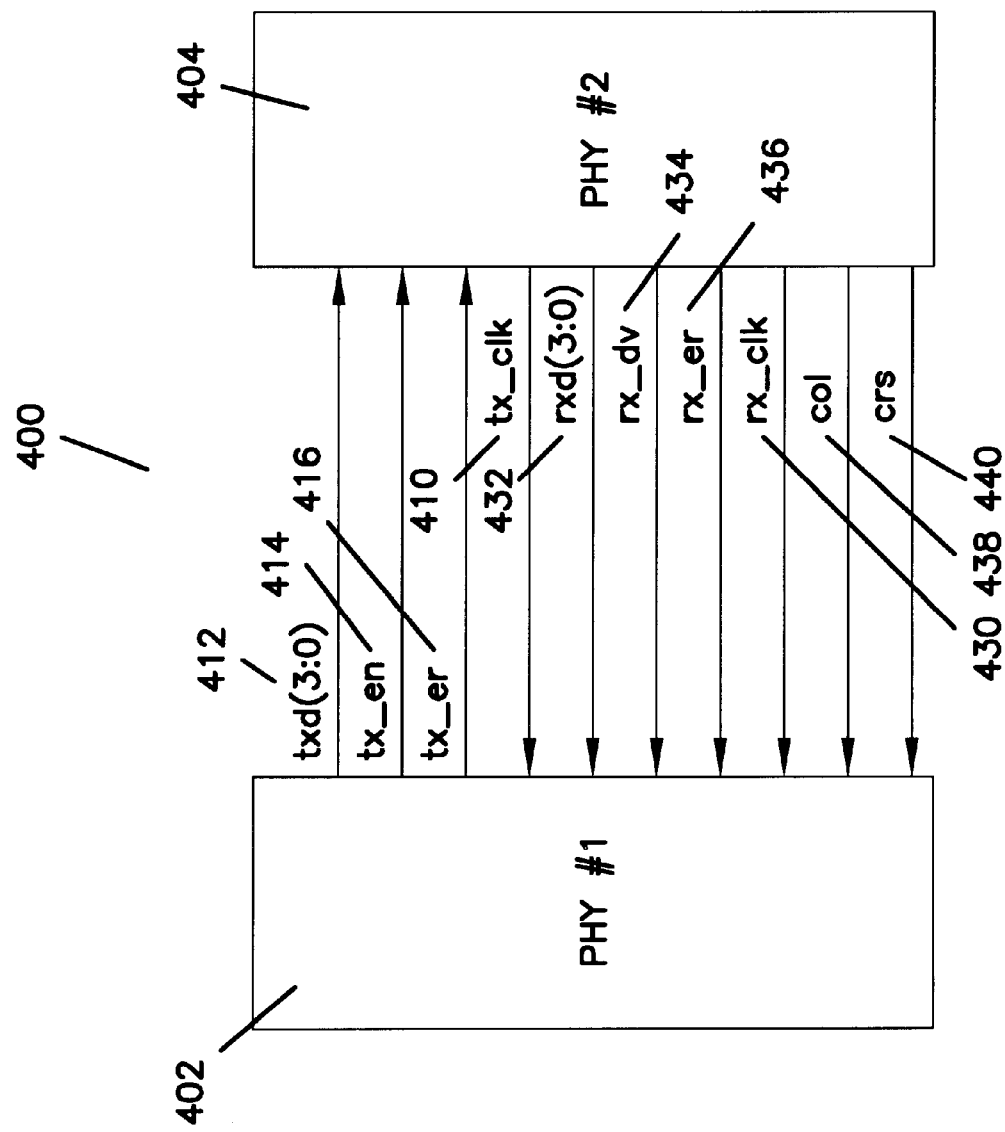
FIG. 4 illustrates a PHY/PHY connection wherein a first Physical Layer device is connected to a second Physical Layer device with the first Physical Layer device acting as the Media Access Control side of the Medium Independent Interface.

FIG. 4 illustrates a PHY/PHY connection 400 wherein a Physical Layer device 402 is connected to another Physical Layer device 404. Accordingly, FIG. 4 illustrates the Media Independent Interface (MII) providing a connection between two Physical Layer devices 402, 404. A Physical Layer device design according to the present invention includes a MII I/F entity for providing this type of connection. Therefore, the MII I/F allows the Physical Layer device having the MII I/F (i.e., the PHY/MII device) to be connected to another Physical Layer device. In this case, PHY #1 402 emulates the Media Access Control side of the Media Independent Interface.

Receive data 432 is defined here as data received from one of the ports that must be transferred from PHY/MII device to a device connected on the other side of the Media Independent Interface. The data path is different depending on whether the other device is a Media Access Control or a Physical Layer device.

When the Physical Layer device is connected to a Media Access Control entity as illustrated in FIG. 3, the PHY/MII device 304 is emulating the behavior of the Physical Layer device side of the Media Independent Interface. Data is received by the Media Access Control 302 on RXD 332, is framed by RXDV 334, and error indication is provided via RXER 336. All of these signals are synchronous to RXCLK 330 which is sourced by the PHY/MII device 304. In addition, collision 338 and carrier sense 340 information are sent by the PHY/MII device 304 to the Media Access Control via COL 338 and CRS 340 respectively.

Referring again to FIG. 4, when the Physical Layer device (PHY/MII device) 402 is connected to another Physical Layer device 404, the Physical Layer device 402 having the Media Independent Interface I/F (PHY/MII device) is emulating the behavior of the Media Access Control side of the Media Independent Interface. Transmit data is data that is transferred from a port whose speed matches the speed of the MII through the PHY/MII device 402 to the second PHY device 404 via TXD 412, TXEN 414, and TXER 416.

As illustrated in FIG. 3, when a Physical Layer device 304 is connected to a Media Access Control entity 302, the data, framing signal, and error are carried on TXD 312, TXEN 314, and TXER 316 respectively, while collision and carrier sense are unused in data transmission.

As illustrated in FIG. 4, when the Physical Layer device 402 according to the invention is connected to a second Physical Layer device 404, data is received by the Physical Layer device (PHY/MII) 402 on RXD 432, the framing signal on RXDV 434, the error indication on RXER 436 and clock 430. The connected Physical Layer device 404 outputs information on collision 438 and carrier sense 440. Collision information is unused by PHY/MII device 402. Carrier sense 440, RXDV 434, and RXD 432 are used to generate a false carrier indication.

With reference to FIG. 3, a loopback path may be provided when the PHY/MII device 304 is connected to a Media Access Control entity and the Media Independent Interface speed is set for 10Base-T operation. When transmit enable is active, transmit data is looped back to the receive data pins and receive data valid is activated.

The PHY/MII device 304 is responsible for generating TXCLK 310 and RXCLK 330 when it is connected to a Media Access Control entity 302 on the Media Independent Interface. When the Media Independent Interface is set to 100Base-X, both TXCLK 310 and RXCLK 330 will be set to the PHY/MII device's 304 internal 25 MHz clock. When the Media Independent Interface is set to 10Base-T, TXCLK 310 and RXCLK 330 will be set to the PHY/MII device's 304 internal 2.5 MHz clock. The output clocks are not driven by PHY/MII device 402 when the PHY/MII device 402 is connected to a Physical Layer device 404 as illustrated in FIG. 4.

Carrier Sense 340 is active when the PHY/MII device 304 is connected to a Media Access Control entity 302 and either transmit enable 314 is active or the data valid 334 from the repeater that is the same speed as the Media Independent Interface is active. The Collision Detect 338 is active when the PHY/MII device 304 is connected to a Media Access Control entity 302 and the collision signal 338 from the repeater that is the same speed as the Media Independent Interface is active.

Figure 5:
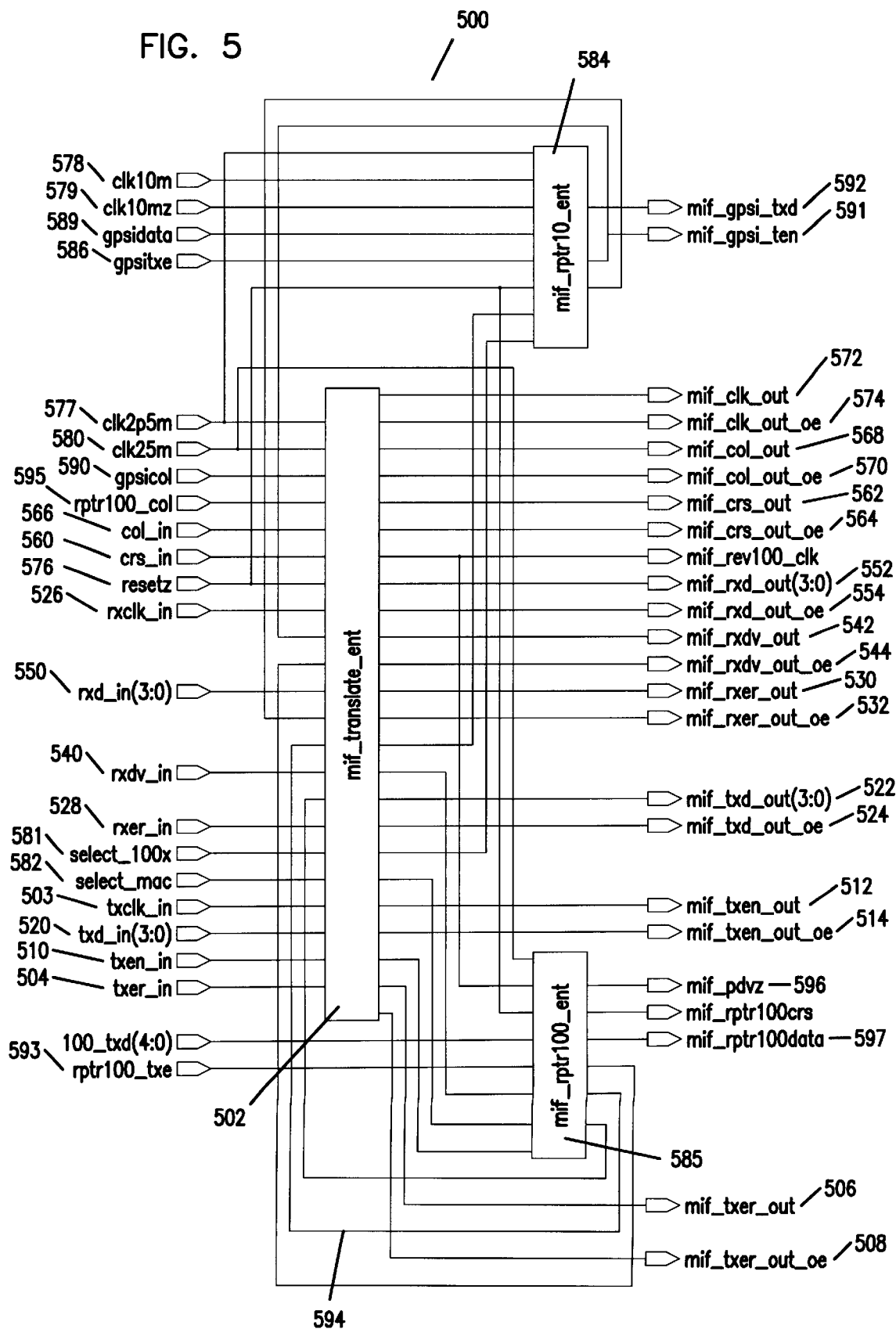
FIG. 5 illustrates a Media Independent Interface/Physical Layer device (PHY/MII device) having a Media Independent Interface entity (MIF entity)

FIG. 5 illustrates a Media Independent Interface entity (MIF entity) 500 of a PHY/MII device according to the present invention. The MIF entity 500 includes a MIF translate entity 502. In FIG. 5, TXCLK_IN 503 is the transmit clock which is used to synchronize the transmit data path. When the MIF entity 500 having the MIF translate entity 502 is connected to a 100 Base X Physical Layer device, this transmit clock 503 is sourced by the other Physical Layer device and used by the MIF translate entity 502 to source transmit data, data qualifier, and error to the other Physical Layer device.

TXER_IN 504 is generated by a 100BaseX MAC (or 100BaseX PHY/MII device emulating a MAC) to tell a Physical Layer device that a transmit error has occurred in the MAC. Transmit Data for a clock cycle with TXER_IN 504 active will be replaced by the HALT symbol if the PHY/MII device having the MIF translate entity 502 is connected to a Media Access Control entity.

MIF_TXER_OUT 506 is generated by the MIF translate entity 502 when a MIF entity 500 is connected to a 100 Base X Physical Layer device and a packet being transferred to the Physical Layer device terminates prematurely (IDLE symbols or loss or enable signal from the repeater section) or a symbol other than data or a TR pair is transferred from the repeater block.

MIF_TXER_OUT_OE 508 is the output enable which turns on the MIF entity's 500 output buffer that is connected to the TXER pad. When the MIF entity 500 is connected to a 100 Base X Physical Layer device, the MIF entity 500 will drive TXER. When the MIF entity 500 is connected to a Media Access Control entity, the output buffer will be tri-stated.

TXEN_IN 510 is the transmit enable signal generated by a Media Access Control entity to the MIF entity 500 when data is to be transferred from Media Access Control to the PHY/MII device. It frames the Media Access Control's packet from preamble to frame check sequence.

MIF_TXEN_OUT 512 is the transmit enable signal generated by MIF entity 500 when data is to be transferred from the PHY/MII device to a 100 Base X Physical Layer device. The PHY/MII device frames the packet from preamble to frame check sequence.

MIF_TXEN_OUT_OE 514 is the output enable that controls the output buffer for the TXEN pad. The output enable is active when the PHY/MII device is connected to a 100 Base Physical Layer device and inactive when the PHY/MII device is connected to a Media Access Control entity.

TXD_IN 520 is the 4 bit wide transmit data from the Media Access Control entity to the PHY/MII device.

MIF_TXD_OUT 522 is the 4 bit wide transmit data from the PHY/MII device to a connected 100 Base X Physical Layer device. MIF_TXD_OUT_OE 524 is the output enable that controls the 4 TXD output drivers. The output enable 524 is active when PHY/MII device is connected to a Physical Layer device and inactive when PHY/MII device is connected to a Media Access Control entity.

RXCLK_IN 526 is similar to TXCLK_IN except that it is used for the receive data path. The RXCLK_IN 526 is generated by the other Physical Layer device when the PHY/MII device is connected to a 100 Base X Physical Layer device instead of a Media Access Control entity.

RXER_IN 528 is used when the PHY/MII device is connected to a 100 Base X Physical Layer device. RXER_IN 528 indicates that a receive error has occurred in the Physical Layer device and causes the Physical Layer device's receive data to be changed to a HALT symbol for that receive clock cycle.

MIF_RXER_OUT 530 is the indication from the PHY/MII device to a Media Access Control entity that a receive error has occurred during the current packet. Error conditions include premature loss of enable signal from the repeater, a packet that terminates in idles instead of a TR pair, and any symbols other than data or a TR pair. MIF_RXER_OUT_OE 532 is the output enable for the driver connected to the RXER pad. The output enable 532 is active when the PHY/MII device is connected to a Media Access Control entity and inactive when the PHY/MII device is connected to a 100 Base X Physical Layer device.

RXDV_IN 540 is the framing signal that indicates that data on RXD is valid. The framing signal 540 is used in the MIF entity 500 when data is to be transferred from a connected 100 Base X Physical Layer device to the PHY/MII device. MIF_RXDV_OUT 542 is used when the PHY/MII device is connected to a Media Access Control entity. MIF_RXDV_OUT 542 qualifies the data that is being transferred from the PHY/MII device to the Media Access Control on RXD. MIF_RXDV_OUT 542 is also active during loopback of transmit data to receive data when the MII is configured as 10Base T. MIF_RXDV_OUT_OE 544 is the output enable for the driver connected to the RXDV pad. The output enable 544 is active when the PHY/MII device is connected to a Media Access Control entity and inactive when the PHY/MII device is connected to a 100 Base X Physical Layer device.

RXD_IN 550 is the 4 bit wide data that is transferred from a connected 100 Base X Physical Layer device to the PHY/MII device. MIF_RXD_OUT 552 is the 4 bit wide receive data transferred from the PHY/MII device to a connected Media Access Control entity. MIF_RXD_OUT_OE 554 is the output enable that controls the 4 RXD output buffers. The output enable 554 is active when the PHY/MII device is connected to a Media Access Control entity and inactive when PHY/MII device is connected to a 100 Base X Physical Layer device. CRS_IN 560 is the carrier sense generated by a 100 Base X Physical Layer device connected to the PHY/MII device. MIF_CRS_OUT 562 is the carrier sense generated by the PHY/MII device which is sent to a connected Media Access Control entity. MIF_CRS_OUT 562 is active when the PHY/MII device is actively receiving or transmitting a packet. MIF_CRS_OUT_OE 564 is the output enable for the CRS output buffer. Output enable 564 is active when the PHY/MII device is connected to a Media Access Control entity and inactive when the PHY/MII device is connected to a Physical Layer device.

COL_IN 566 is the collision signal from a connected 100 Base X Physical Layer device. MIF_COL_OUT 568 is the collision signal generated by the PHY/MII device and sent to a connected Media Access Control entity. MIF_COL_OUT_OE 570 is the output enable signal that controls the output driver for the COL pad. MIF_COL_OUT_OE 570 is active when the PHY/MII device is connected to a Media Access Control entity and inactive when the PHY/MII device is connected to a Physical Layer device.

MIF_CLK_OUT 572 is the 25 MHz (100 Base X) or 2.5 MHz (10 Base T) clock generated by the PHY/MII device when connected to a Media Access Control entity. The clock frequency is set by the device pin that selects 10 Base T or 100 Base X operation for the MII entity 500. MIF_CLK_OUT 572 is output on both the RXCLK and TXCLK pads since receive and transmit clocks are identical after the data has been processed by the repeater block. MIF_CLK_OUT_OE 574 is the output enable for both the RXCLK and TXCLK output drivers. MIF_CLK_OUT_OE 574 is active when the PHY/MII device is connected to a Media Access Control entity and inactive when the PHY/MII device is connected to a 100 Base X Physical Layer device.

RESETZ 576 is the input signal that initializes the MIF entity 500. CLK2P5M 577 is the 2.5 MHz clock generated by the PHY/MII device's CLK_TOP block. CLK2P5M 577 is used for 10 Base T nibble wide data. CLK2P5M's 577 transitions must be generated by the rising edges of CLK10M 578. CLK10M 578 is the 10 MHz clock generated by the PHY/MII device's CLK_TOP block. CLK10M 578 is used for 10 Base T serial data. CLK10MZ 579 is an inverted 10 MHz clock. CLK10MZ 579 is used for synchronization of signals between the CLK10M 578 and CLK2P5M 577 clock zones since CLK2P5M 577 is generated from the rising edge of CLK10M 578 and may be slightly advanced or delayed from CLK10M 578 depending on layout. CLK25M 580 is the 25 MHz clock generated by PHY/MII device CLK_TOP block. CLK25M 580 is used for 100 Base X symbols and nibble wide data.

SELECT_100X 581 is an input to MIF entity 500 from a device pin. When a logic 1, 100 Base X operation is selected. When a logic 0, 10 Base T operation is selected. SELECT_MAC 582 is also an input from a device pin. When a logic 1, operation with the PHY/MII device connected to a Media Access Control entity on the Media Independent Interface is selected. Operation with the PHY/MII device connected to a 100 MHz Physical Layer device is selected when SELECT_MAC 582 is set to logic 0.

Thus, the PHY/MII device may be used to emulate a Media Access Control entity where a Media Access Control entity is not present. For example, a Media Access Control entity is commonly absent in 10Base-T and 100Base-X repeaters. Therefore, a PHY/MII device may also interface to repeater entities as well as providing the Media Independent Interface functions described above. FIG. 5 illustrates a translation entity 502, which switches between a connected MAC or PHY, interfacing with a 10 Mbps entity 584 which formats data for a 10 Mbps repeater entity, and a 100 Mbps entity 585 which formats data for a 100 Mbps repeater entity.

In FIG. 5, GPSITXE 586 is an input to the MIF entity 500 that indicates that 10 MHz data from the repeater block is valid. GPSIDATA 589 is an input to the MIF translation entity 502 that represents the 10 MHz serial data from the repeater block. GPSICOL 590 is an input to the MIF entity 500 that shows when a collision has been detected by the 10 MHz repeater block. MIF_GPSI_TEN 591 is an output from the MIF entity 500 to the 10 MHz repeater entity 584 that is active when valid data is being transferred from the MIF entity 502 to the 10 Mbps entity 584. MIF_GPSI_TXD 592 is an output from the MIF entity 500 to the 10 Mbps entity 584 that carries the serial data that was input to the Media Independent Interface entity 500.

RPTR100_TXE 593 is an input to the MIF entity 500 that indicates that 100 MHz data from the 100 Mbps repeater block is valid. RPTR100_TXD 594 is an input to the MIF entity 500 that represents the 25 MHz symbols from the 100 MHz repeater block. RPTR100_COL 595 is an input to the MIF entity 500 that shows when a collision has been detected by the 100 MHz repeater block. MIF_PDVZ 596 is an output from the MIF entity 500 to the 100 MHz repeater that is active when valid data is being transferred from the MIF entity 500 to the 100 MHz repeater. MIF_PDVZ 596 is active low. MIF_RPTR100DATA 597 is an output from the MIF entity 500 to the 100 MHz repeater that carries the symbols encoded from the nibble wide Media Independent Interface data.

Figure 6:
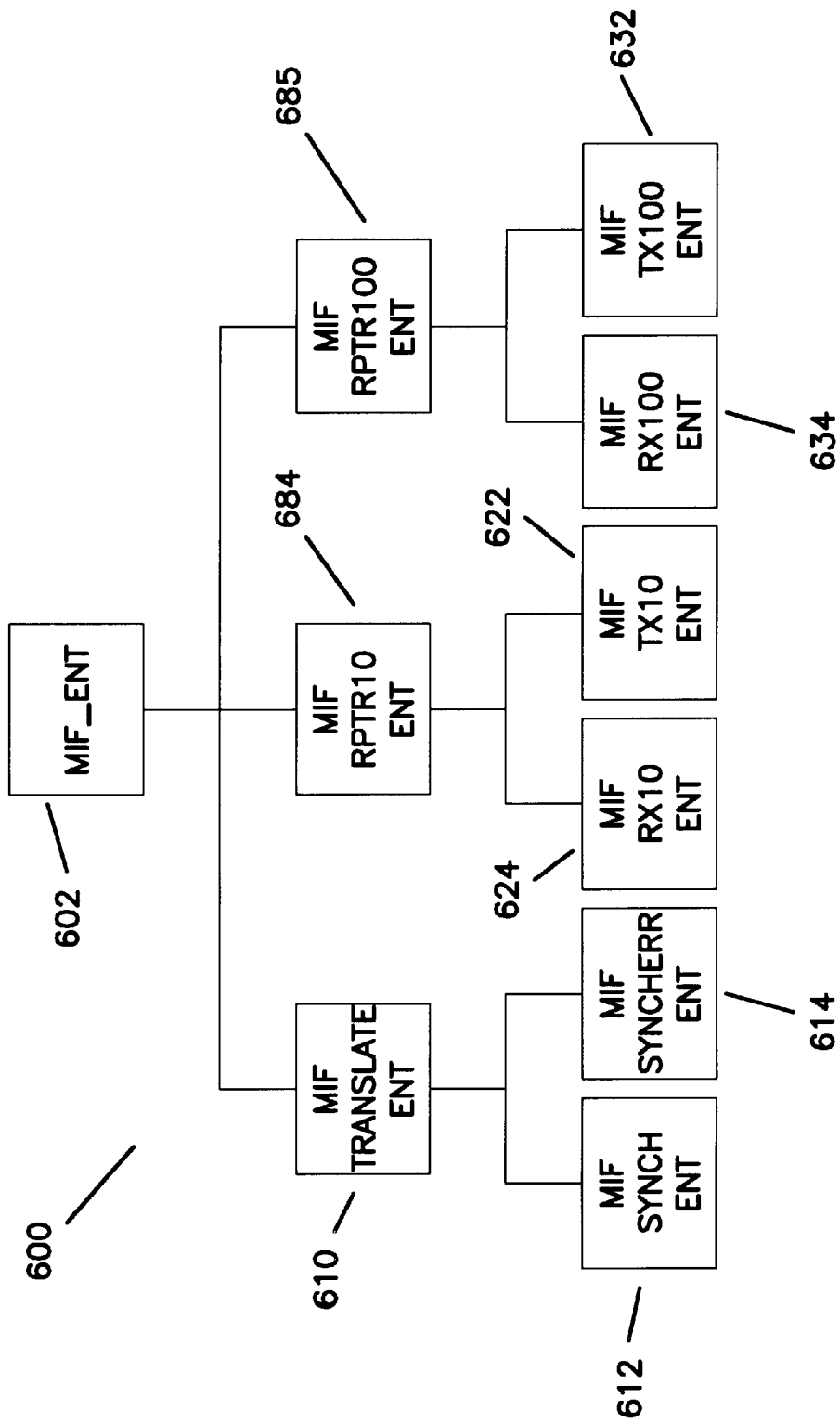
FIG. 6 shows the design hierarchy for the MIF entity including the 10 Mbps repeater entity and 100 Mbps repeater entity.

FIG. 6 shows the design hierarchy 600 for the MIF entity 602 including the 10 Mbps repeater interface entity 684 and 100 Mbps repeater interface entity 685. In FIG. 6, the MIF TRANSLATE ENTITY 610 generates the output enables required for the Media Independent Interface pads located in IO_PADS, muxes data and control signals depending on the 10/100 and MAC/Physical Layer device settings, and synchronizes between the PHY/MII device's internal clocks and the Media Independent Interface transmit and receive clocks when the PHY/MII device is connected to another Physical Layer device. The synchronization is done using two instantiated components, MIF_SYNCH_ENT 612 and MIF_SYNCHERR_ENT 614.

MIF_SYNCH_ENT 612 is used to synchronize the 10 Base T signals when the PHY/MII device is connected to a Physical Layer device. The Physical Layer device sources TXCLK and RXCLK which are the 2.5 MHz clocks used for the Media Independent Interface in 10 Base T mode. Data from the PHY/MII device's 10 MHz repeater block is synchronous to the PHY/MII device's internal 10 MHz clock and the nibbles assembled in MIF entity 602 are synchronous to the PHY/MII device's 2.5 MHz clock. Assuming that the same crystal is used to derive the Physical Layer device's and the PHY/MII device's 2.5 MHz clock, the frequency of the clocks will be identical but may be out of phase by any amount due to differing delays in the Physical Layer device and the PHY/MII device.

Metastability can normally be handled using two flip-flops in series as long as the duration of the metastable event is less than the clock period. This approach cannot be used in the case where the information is more than one bit wide. This is because the state of the flip-flop after the metastable event cannot be predicted. Two flip-flops side by side may end up at different states at the end of the event if one flop assumes the new value while the old flop returns to the old value. This would cause erroneous data to be transferred across the interface or cause a nibble of data to be missed if the framing signal was delayed by an extra clock.

A circular buffer is used to preserve the integrity of the nibble wide data and the data valid framing signal. The circular buffer has data and data valid signals clocked in using one clock and data and data valid signals clocked out using the other clock. The circular buffer is five bits wide (4 data bits and one framing bit) and has four locations for storing the 5 bit wide information. A packet will always be loaded in starting at location 0, then locations 1, 2, and 3, and then repeating the sequence until the packet ends. When a packet ends, writing continues for four more locations which clears out the data and the data valids.

MIF_SYNCHERR_ENT 614 is identical to MIF_SYNCH_ENT 612 except that it is used for the 100 BASE X data path. The difference between the 10 Base T and 100 Base X paths is that an error signal is added to the 100 Base X path making the circular buffer 6 bits wide instead of 5.

MIF_RPTR10_ENT 684 is the interface to the PHY/MII device's 10 Base T repeater block. It maps the 10 Base T transmit and receive data paths, which are MIF_TX10_ENT 622 and MIF_RX10_ENT 624 respectively. MIF_TX10_ENT 622 is the transmit data path from MIF_TRANSLATE_ENT 602 to the 10 Base T repeater. Data comes in to MIF_TX10_ENT 624 from MIF_TRANSLATE_ENT 602 synchronous to the PHY/MII device's internal 2.5 MHz clock and goes out to the 10 Base T repeater synchronous to the PHY/MII device's 10 MHz clock. Changes in the logic level of the 2.5 MHz clock will be related to a rising edge of the 10 MHz clock. Transmit data and transmit enable signals that are synchronous to the 2.5 MHz clock will be synchronized to the falling edge of the 10 MHz clock to guarantee their stability in the 10 MHz clock zone.

Nibble wide data that is synchronous to the 2.5 MHz clock must be serialized and sent to the 10 Base T repeater synchronous to the 10 MHz clock. The 2.5 MHz clock is sampled using the falling edge of the 10 MHz clock. The detection of a rising edge of the 2.5 MHz clock loads data and transmit enable into a storage register and sets the output bit to bit 0 of the transmit data. On the next rising edge of the 10 MHz clock. bit 0 and the transmit enable signal are sent to the 10 Base T repeater block. On subsequent 10 MHz rising edges, bits 1, 2, and then 3 will be output.

MIF_RX10_ENT 624 is the receive data path from the 10 Base T repeater block to MIF_TRANSLATE_ENT 602. Serial data from the 10 MHz repeater must first be assembled into nibbles. The signal GPSITXE 586 of FIG. 5 is used to recognize the start of a packet and begins the bit to nibble conversion. The first bit of a packet goes into the most significant bit of the storage register. As the bits are collected, they are progressively shifted from MSB to LSB.

Serial data from the 10 MHz repeater must be synchronized to the 2.5 MHz clock. When 4 bits have been collected, the data is shifted into a storage register on the falling edge of the 10 MHz clock. The nibble wide data can now by synched to the 2.5 MHz clock.

Figure 7:
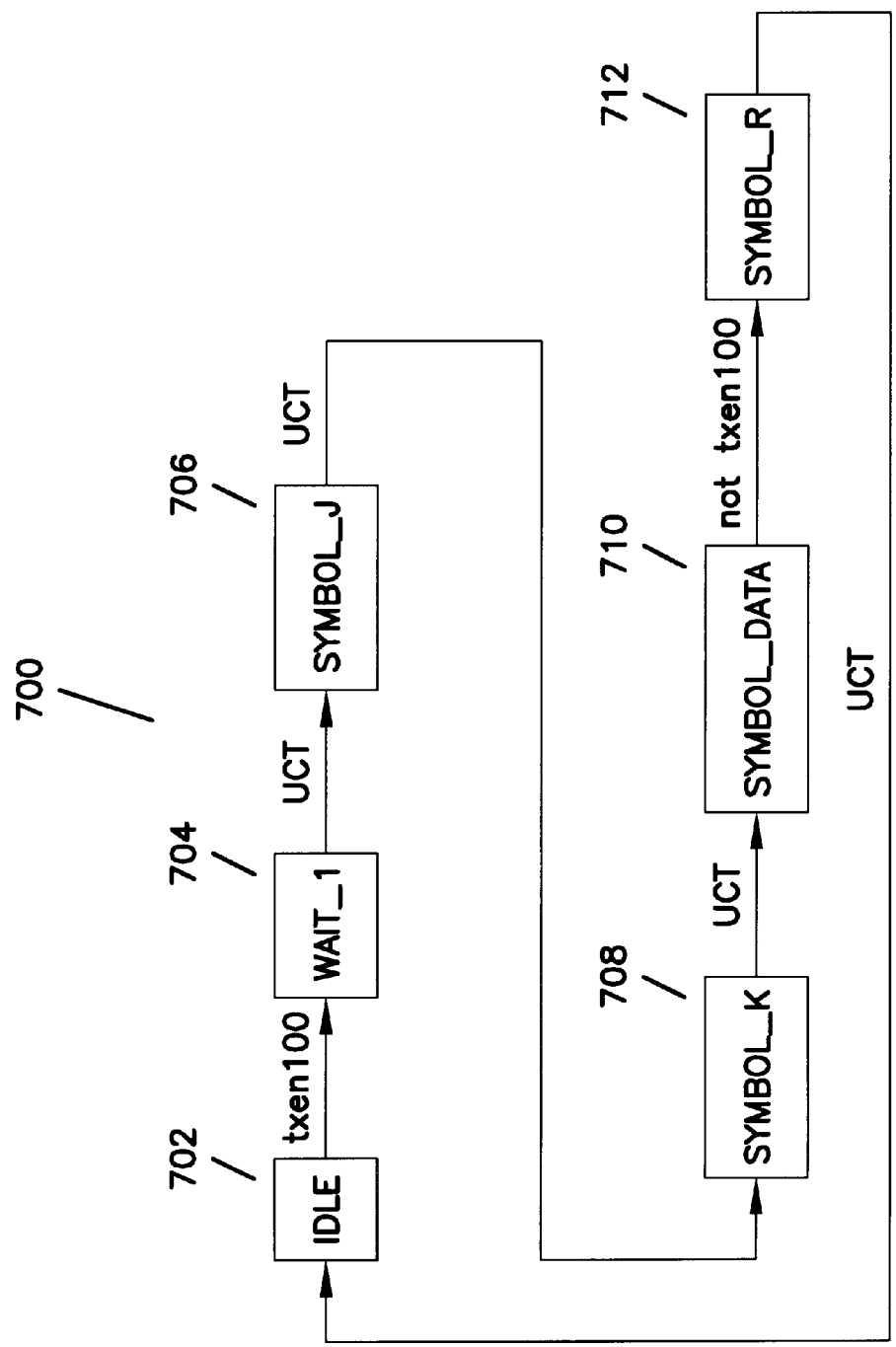
FIG. 7 illustrates a transmit state diagram.

MIF_RPTR100_ENT 685 is the interface to the PHY/MII device's 100 Base X repeater block. It maps the 100 Base X transmit and receive data paths, which are MIF_TX100_ENT 632 and MIF_RX100_ENT 634 respectively. MIF_TX100_ENT 632 contains the state machine that inserts the start and end of frame delimiters and encodes the 4 bit data into 5 bit symbols. FIG. 7 illustrates a transmit state diagram 700.

In FIG. 7, IDLE 702 waits for the transmit enable signal that comes from MIF_TRANSLATE_ENT 602. When TXEN100 goes active, the carrier sense signal to the 100 MHz repeater is activated and the state machine transitions to the state WAIT_1 704. WAIT_1 704 is a state which keeps the carrier sense active. IDLE 702 and WAIT_1 704 guarantee that the carrier sense is active 2 clocks before data is sent to the 100 MHz repeater. The data valid signal is now activated and the J symbol is sent to the 100 MHz repeater 706. The K symbol is sent to the 100 MHz repeater 708.

The JK pair is substituted for the first two nibbles of data from MIF_TRANSLATE_ENT 602. This means that the data must be delayed by 2 clocks to allow for 2 clocks of carrier sense. The transmit error signal must also be delayed for 2 clocks so it lines up with the correct nibble and the data valid signal must be delayed by 2 clocks so it frames the data correctly. While in the state SYMBOL_DATA 710, nibble wide data is encoded into 5 bit symbols. If transmit error is active, the symbol sent to the repeater will be H. When transmit enable goes away, the symbol sent to the repeater is T and the state machine transitions to SYMBOL_R 712.

SYMBOL_R 712 is the final state which sends the R symbol to the 100 MHz repeater. The state machine will unconditionally transition to IDLE 702.

Figure 8:
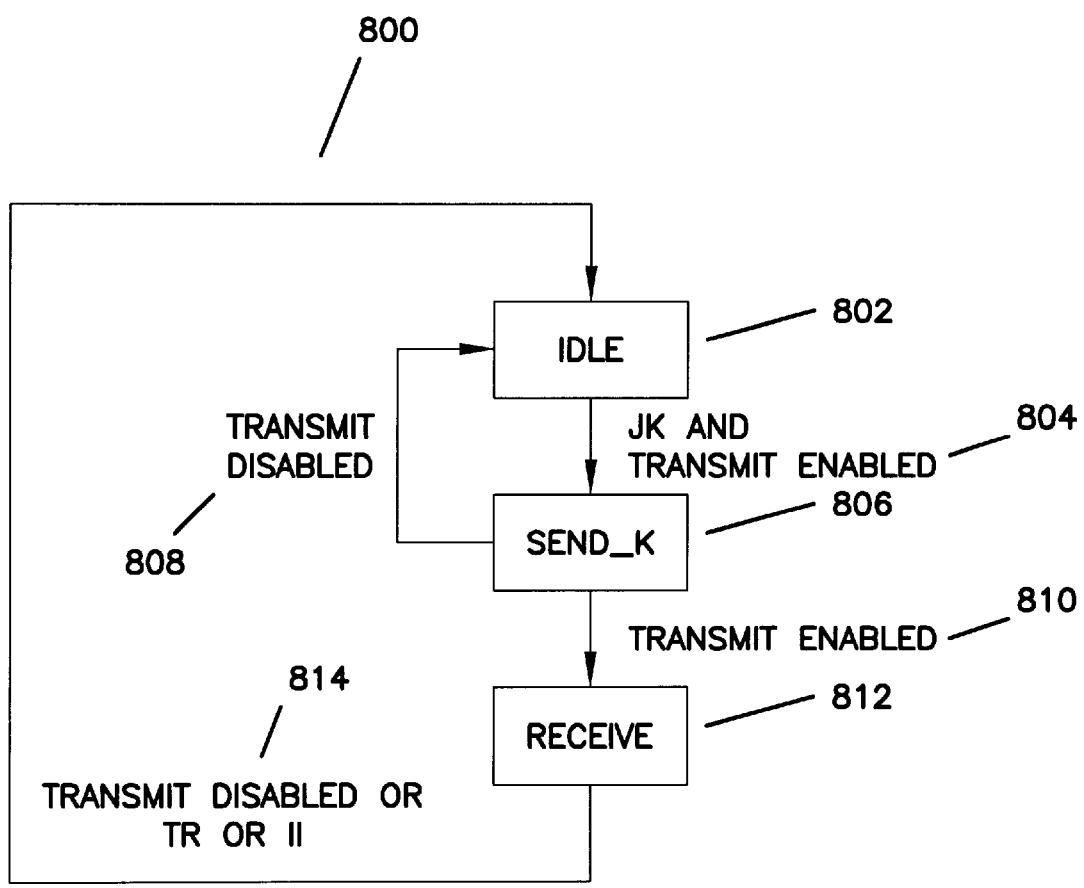
FIG. 8 illustrates the receive state diagram.

MIF_RX100_ENT 634 of FIG. 6 contains portions of the receive state machine described in the IEEE 802.3u specification. FIG. 8 illustrates the receive state diagram 800.

IDLE 802 is the default state after reset. During IDLE 802, the state machine is waiting for transmit enable to go active and for a JK symbol pair to be sent from the 100 MHz repeater 804. When this occurs, the output data is set to "0101", the data valid is activated, and the state machine transitions to the SEND_K state 806. Since the 100 MHz repeater guarantees by design that a JK will be the first 2 symbols sent to MIF_RX100_ENT 634, there is no mechanism to flag a bad SSD error.'

SEND_K 806 is the state after a JK pair has been received where a preamble nibble is substituted for the K symbol. If transmit enable from the 100 MHz repeater goes inactive, the receive error is activated with data valid still asserted, and the state machine transitions back to idle 808. If transmit enable stays active 810, the preamble nibble "0101" is output, data valid remains asserted, and the state machine transitions to RECEIVE 812. RECEIVE 812 is the state where the end of packet is detected and symbols are decoded into nibbles. The state machine remains in RECEIVE 812 until either a normal or abnormal end of packet is detected 814. A normal end of packet is the reception of a TR pair. When a TR pair is recognized, the data valid is immediately removed which ends the transfer between the PHY/MII device and the Media Independent Interface. Two abnormal end of packets are recognized which result in receive error being asserted with data valid still active for 1 clock. They are an Idle symbol pair and loss of transmit enable from the 100 MHz repeater. Both an abnormal and a normal end of packet results in the state machine transitioning back to IDLE. If the symbol from the 100 MHz repeater is one of the data symbols (0–F) and transmit enable is still active, then the symbol is decoded into the corresponding nibble, data valid stays asserted, and the receive error remains inactive. Any other symbol will result in receive error being asserted with data valid still asserted. The nibble wide data in this case will be set to "0000".

FIG. 9 is a table 900 illustrating the state of the output enables which depend on the type of device that the PHY/MII device is connected to on the Media Independent Interface. The first column 902 lists the names of the outputs for the MIF entity. The second column 904 lists the states of the outputs for the MIF entity when the PHY/MII device is connected to a Media Access Control entity as illustrated in FIG. 3. The third column 906 lists the states of the outputs for the MIF entity when the PHY/MII device is connected to another Physical Layer device as illustrated in FIG. 4.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A Physical Layer device, comprising:
   a selector to select between a first mode of operation which links a first Physical Layer device to a Media Access Control (MAC) wherein the Media Access Control (MAC) is present, and a second mode of operation which links a first Physical Layer device to a second Physical Layer device wherein a Media Access Control (MAC) is absent;

a media independent interface, operatively coupled to the selector to provide a synchronous digital interface carrying un-encode data over separate transmit and paths; and a translation entity, operatively coupled to the selector to generate output enables for controlling a flow of data, the translation entity establishing a first flow of data for connecting the first Physical Layer device to the Media Access Control in the first mode of operation and a second flow of data for connecting the first Physical Layer device to the second Physical Layer device in the second mode of operation.

2. The Physical Layer device of claim 1 wherein the translation entity muxes data and control signals based upon the mode selection.

3. The Physical Layer device of claim 1 further comprising a translation synchronization entity.

4. The Physical Layer device of claim 3 wherein the synchronization entity comprises a 10 Mbps synchronization entity.

5. The Physical Layer device of claim 3 wherein the synchronization entity comprises a 100 Mbps synchronization entity.

6. The Physical Layer device of claim 2 further comprising an error signal.

7. The Physical Layer device of claim 3 further comprising an internal clock, and wherein the media independent interface receives a transmit and receive clock from the second Physical Layer device when the first Physical Layer device is connected to the second Physical Layer device, the translation synchronization entity synchronizing the internal clocks and the media independent interface transmit and receive clocks.

8. The Physical Layer device of claim 3 further comprising an interface to a 10 Mbps repeater entity, the 10 Mbps interface mapping a transmit data path from the translation entity to the 10 Mbps repeater entity and receive data paths from the 10 Mbps repeater entity to the translation entity.

9. The Physical Layer device of claim 3 further comprising an interface to a 100 Mbps repeater entity, the 100 Mbps interface mapping a transmit data path from the translation entity to the 100 Mbps repeater entity and receive data paths from the 100 Mbps repeater entity to the translation entity.

10. The Physical Layer device of claim 1 further comprising a speed selector operatively coupled to the media independent interface for setting the speed of operation for the media independent interface.

11. A Physical Layer device, comprising:

a selector to select between a first mode of operation which links a first Physical Layer device to a Media Access Control (MAC) wherein the Media Access Control (MAC) is present, and a second mode of operation which links a first Physical Layer device to a second Physical Layer device wherein a Media Access Control (MAC) is absent; and a media independent interface, operatively coupled to the selector, the media independent interface having a clock output, a transmit data port, a transmit enable port, a transmit error port, a receive data port, a receive data valid port, a receive error port, a collision signal port and a carrier sense signal port, wherein a state of each of the ports of the media independent interface are controlled by the selector.

12. The Physical Layer device of claim 11 wherein the transmit data port, transmit enable port, and transmit error port are activated in response to the selector being set for linking the first Physical Layer device to the second Physical Layer device.

13. The Physical Layer device of claim 12 wherein the clock output, the receive data port, the receive data valid port, the receive error port, the collision signal port and the carrier sense signal port deactivated.

14. The Physical Layer device of claim 11 wherein the clock output, the receive data port, the receive data valid port, the receive error port, the collision signal port and the carrier sense signal port are activated in response to the selector being set for linking the first Physical Layer device to the Media Access Control.

15. The Physical Layer device of claim 14 wherein the transmit data port, transmit enable port, and transmit error port are deactivated.

16. The Physical Layer device of claim 11 further comprising a speed selector operatively coupled to the media independent interface for setting the speed of operation for the media independent interface.

17. A method of interfacing a first Physical Layer device to a second Physical Layer device, comprising the steps of:

selecting between a first mode of operation which links a first Physical Layer device to a Media Access Control (MAC) wherein the Media Access Control (MAC) is present, and a second mode of operation which links a first Physical Layer device to a second Physical Layer device wherein a Media Access Control (MAC) is absent;

providing a synchronous digital interface carrying un-encoded data over separate transmit and receive paths; and generating output enables for controlling a flow of data, and establishing a first flow of data for connecting the first Physical Layer device to the Media Access Control in the first mode of operation and a second flow of data for connecting the first Physical Layer device to the second Physical Layer device in the second mode of operation.

18. The method of claim 17 further comprising the step of muxing data and control signals based upon the mode selection.

19. The method of claim 17 further comprising the step of synchronizing the passing of data with a clock.

20. The method of claim 17 further comprising the step of providing an internal clock and receiving a transmit and receive clock from the second Physical Layer device when the first Physical Layer device is connected to the second Physical Layer device, the internal clocks being synchronized with the media independent interface transmit and receive clocks.

21. The method of claim 17 further comprising the steps of mapping a transmit data path from a translation entity to a 10 Mbps repeater entity and mapping a receive data path from the 10 Mbps repeater entity to the translation entity.

22. The method of claim 17 further comprising the steps of mapping a transmit data path from a translation entity to a 100 Mbps repeater entity and mapping a receive data path from the 100 Mbps repeater entity to the translation entity.

23. The method of claim 17 further comprising the step of setting the speed of operation for the media independent interface.

* * * * *

UNITED STATES PATENT AND TRADEMARK OFFICE
CERTIFICATE OF CORRECTION

PATENT NO. : 6,154,464
DATED : November 28, 2000
INVENTOR(S) : Feuerstraeter et al.

It is certified that error appears in the above-identified patent and that said Letters Patent is hereby corrected as shown below:

Title page,
Item [54], title "ENTITICES" should read -- ENTITIES --

Column 17,
Line 8, "un-encode" should read -- unencoded --

Signed and Sealed this

Thirtieth Day of April, 2002

Attest:

Attesting Officer

JAMES E. ROGAN
Director of the United States Patent and Trademark Office